United States Patent
Kim et al.

(10) Patent No.: US 7,198,288 B2
(45) Date of Patent: Apr. 3, 2007

(54) SIDE AIR BAG FOR A MOTOR VEHICLE

(75) Inventors: Joon-Ho Kim, Seoul (KR); Ik-Hwan Kim, Chungcheongnam-do (KR); Byong-Ryong Cho, Kyunggi-do (KR); Gun-Woo Kim, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 97 days.

(21) Appl. No.: 10/326,096

(22) Filed: Dec. 23, 2002

(65) Prior Publication Data

US 2004/0026905 A1    Feb. 12, 2004

(30) Foreign Application Priority Data

Aug. 12, 2002 (KR) .................. 10-2002-0047529

(51) Int. Cl.
*B60R 21/20* (2006.01)
(52) U.S. Cl. .................. 280/730.2; 280/743.1
(58) Field of Classification Search ............ 280/730.2, 280/730.1, 728.1, 743.1, 733; *B60R 21/22*
See application file for complete search history.

(56) References Cited

U.S. PATENT DOCUMENTS 5,112,079 A * 5/1992 Haland et al. ............ 280/730.2
5,161,821 A * 11/1992 Curtis ...................... 280/730.2
5,251,931 A * 10/1993 Semchena et al. ....... 280/730.1
5,556,128 A * 9/1996 Sinnhuber et al. ....... 280/730.2
5,575,497 A * 11/1996 Suyama et al. .......... 280/730.1
5,630,615 A * 5/1997 Miesik .................... 280/730.2
6,092,836 A * 7/2000 Saslecov .................. 280/730.1

FOREIGN PATENT DOCUMENTS

WO    WO 00/21797    *  4/2000
WO    WO 02/100691 A1 * 12/2001

* cited by examiner

*Primary Examiner*—Ruth Ilan
(74) *Attorney, Agent, or Firm*—Greenblum & Bernstein, P.L.C.

(57) ABSTRACT

A side air bag for a motor vehicle capable of protecting not only the lower body but also the upper body of an occupant in case of the lateral collision of a motor vehicle is disclosed. The side air bag for a motor vehicle, includes an air cushion; and a inflator for supplying a gas to the air cushion, wherein the air cushion have an upper body protection area for protecting an upper body including a head and a flank of an occupant; a hip protection area connected to a lower end of the upper body protection area for protecting a hip of the occupant; and a leg protection area connected to the hip protection area with projected forwardly from the hip protection area for protecting the leg of the occupant.

9 Claims, 2 Drawing Sheets

[FIG. 1]
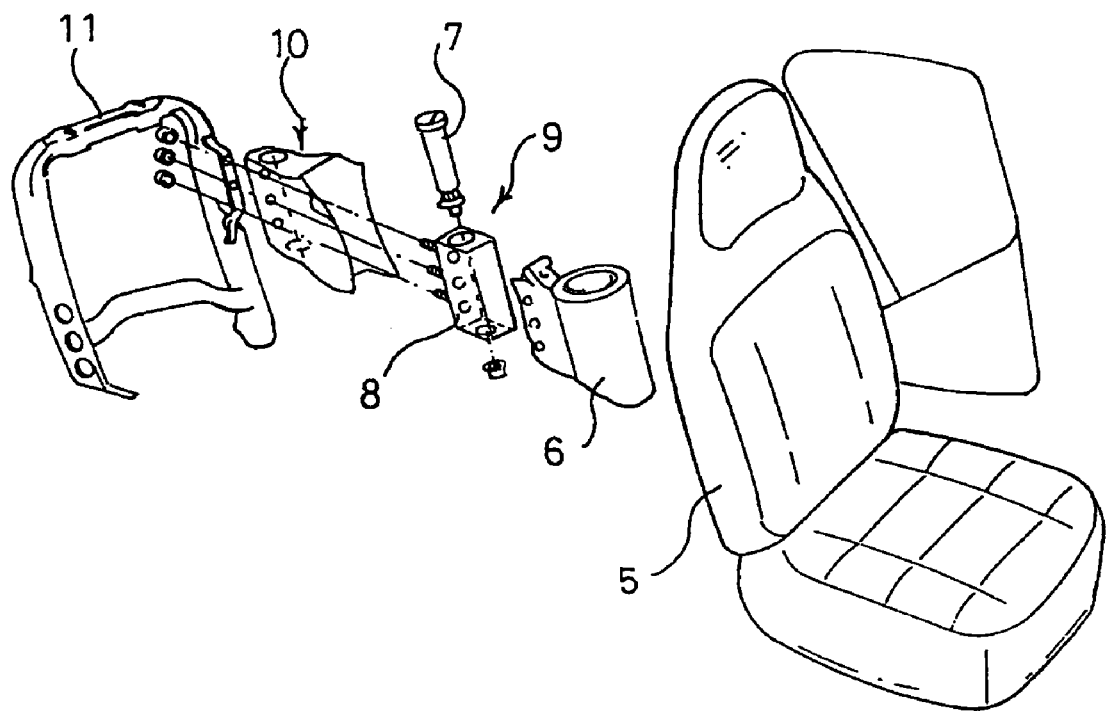

[FIG. 2] RELATED ART
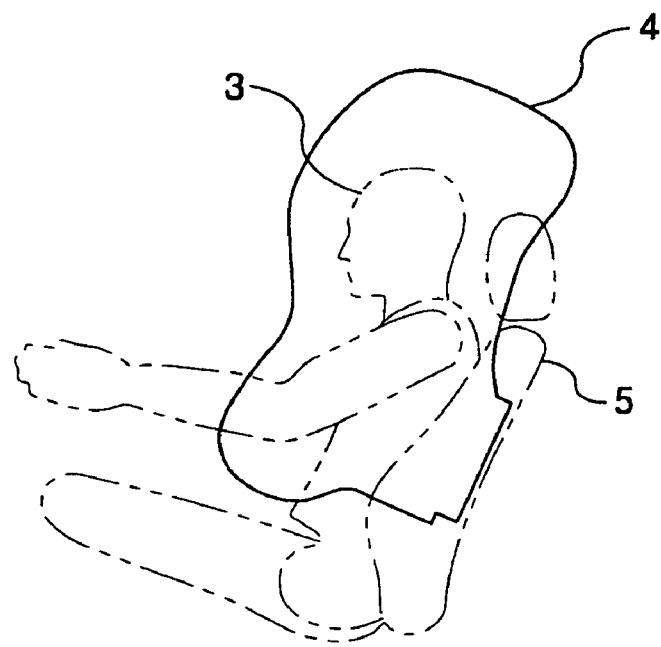
[FIG. 3]
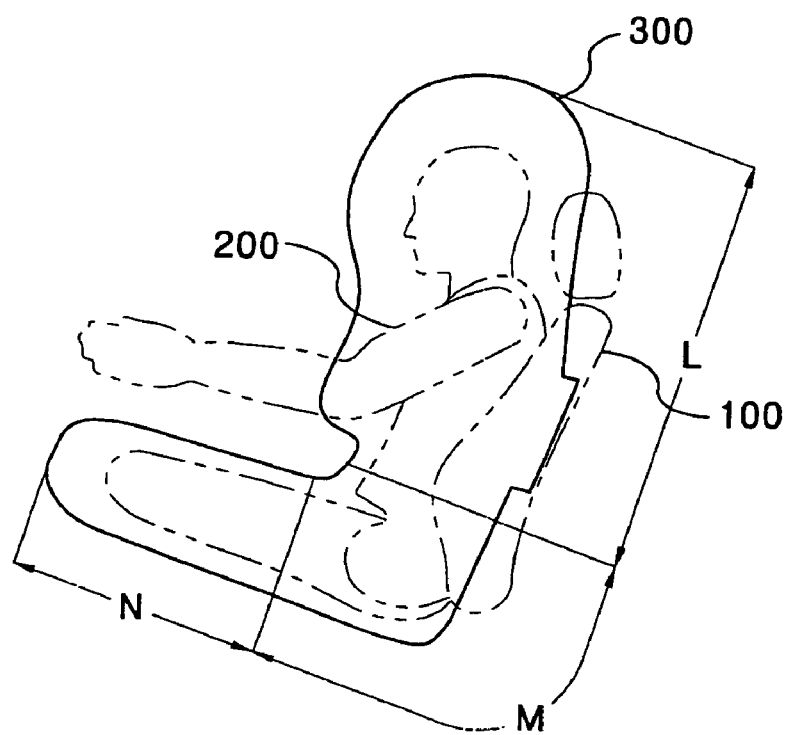

SIDE AIR BAG FOR A MOTOR VEHICLE

BACKGROUND OF THE INVENTION

1. Field of the Invention

The present invention relates to a side air bag for a motor vehicle, in particular, to a side air bag to protect not only the upper body of an occupant but also the lower body in case of the lateral collision.

2. Description of the Related Art

As there is a great deal of concern today for the safety of an occupant with the function and the convenience of the motor vehicle, the importance of the safety-related device capable of protecting the occupant safely in the event a vehicle accident has been increased.

Among these safety devices, in particular, the air bag system is carrying out its function with a seat belt to protect the occupant from being injured in case of the head-on collision or the lateral collision of the motor vehicle.

In general, the air bag system is classified into a front air bag to protect a driver or an occupant in case of the head-on collision and a side air bag to protect the driver or the occupant in case of the lateral collision of the motor vehicle.

The side air bag is classified into several types to protect 1) only the head part of the driver or the occupant, 2) to protect the flank part, 3) to protect the head part and the flank part of the driver and the occupant simultaneously.

FIG. 1 illustrates a side air bag, in particular, the installation structure of the side air bag capable of protecting the head and the flank of the driver or the occupant simultaneously.

Furthermore, FIG. 2 is a view illustrating schematically the deployed air cushion, after the side air bag is operated.

As shown in FIG. 1, the side air bag includes an air bag module assembly having an air cushion 6, an inflator 7, and an inflator housing 8 and an air bag housing 10.

The air bag module assembly 9 includes the air cushion 6, the inflator 7 and the inflator housing 8. The inflator housing 8 is inserted into the air bag housing 10 and is installed on a seat frame 11 of a seat back 5 by means of a cramped tool such as a bolt.

When the inflator 7 is operated by the electric signal in case of the lateral collision of the vehicle according to the above installation structure. Then, it produces designated pressed gas and inflates the internal air cushion with the gas and the air cushion suddenly expands in the certain shape and as shown in FIG. 2, it covers the head part and the flank part of the occupant simultaneously.

As the above related side air bag, however, is able to protect only the upper body such as the head part and the flank part of the occupant. And, it is relatively vulnerable to protect the lower body including the hip, thus, it has not been expected to obtain the entire protection result for the occupant against the lateral collision of the motor vehicle.

SUMMARY OF THE INVENTION

To solve the above-referenced problems, an object of the present invention is to provide a side air bag capable of protecting an upper body and an lower body of an occupant perfectly against a lateral collision of a vehicle.

In order to achieve the above object, there is provided a side air bag for a motor vehicle, comprising: an air cushion; and a inflator for supplying a gas to the air cushion, wherein the air cushion comprises an upper body protection area for protecting an upper body including a head and a flank of an occupant; a hip protection area connected to a lower end of the upper body protection area for protecting a hip of the occupant; and a leg protection area connected to the hip protection area with projected forwardly from the hip protection area for protecting the leg of the occupant.

BRIEF DESCRIPTION OF THE DRAWINGS

The above objects, features and advantages of the present invention will become more apparent from the following detailed description when taken in conjunction with the accompanying drawings, in which:

FIG. 1 is an exploded perspective view showing an installation structure of a related side air bag;

FIG. 2 is a view illustrating schematically a deployed air cushion; and

FIG. 3 is a schematic view illustrating schematically a side air bag according to the present invention.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The present invention will be described hereinafter one preferred embodiment in conjunction with the attached drawings.

FIG. 3 shows a side air bag of a first embodiment according to the present invention, in particular, schematically shows a deployed air cushion.

The side air bag according to the present invention is identical to a related side air bag structure of FIG. 1, excepting a structure of a air cushion. Therefore, the air cushion will be described in detail hereinafter, the description of the components identical to the related art will be omitted.

Referring to FIG. 3, an air cushion 300 of the present invention imaginatively includes an upper body protection area L, a hip protection area M, and a leg protection area N.

The upper body protection area L is to protect an upper body including a head part and a flank part of the occupant 200, and is formed into the given shape to cover the body regions suitably.

Furthermore, the hip protection area M is mainly to protect the hip of the occupant 200, is formed into the given shape to cover the hip suitably, and is integrally connected with the lower end of the upper body protection area L to be communicated with the upper body protection area L.

Moreover, the leg protection area N is to limit legs of the occupant 200, and is protruded forwardly from the hip protection area M, and is also integrally connected with the hip protection area M to be communicated with the hip protection area M.

The operation of the present invention will be described in detail hereinafter.

Firstly, in case of the lateral collision of the motor vehicle, an impact is detected through the collision detection sensor and then the electric signal is generated, and the inflator is operated. The inflator produces the designated pressure of the gas, and then discharges the gas into the air cushion.

At this time, as the air cushion 300 penetrates a side portion of the seat back 100, the upper body protection area L next to the inflator expands, and then the hip protection area M communicated with the upper body protection area L and the leg protection area expand sequentially, thereby extending entirely along a side of the seat as shown in FIG. 3. Therefore, the occupant can be protected in such a manner that it covers the entire region from the head part to the leg part of the occupant. Further, the lower body protection area, which includes the hip protection area and the leg protection area, is connected to and in communication with the upper body protection area to form a generally L-shaped side air bag, as shown in FIG. 3. The upper body protection area L includes a bulge corresponding to the head of the occupant and a side protection area that is narrower than the bulge. Additionally, a recess extends inwardly from a front surface of the side air bag, the recess connecting the upper body protection area L to the lower body protection area (i.e., M and N).

According to the present invention, when the air cushion is deployed by the operation of the air bag, as the upper body protection area expands almost simultaneously with the hip protection area and the leg protection area, the entire regions from the upper body of the occupant to the lower body including the hip and the leg of the occupant can be protected perfectly.

Furthermore, the air bag of the present invention does not require the additional complicated apparatus or wires since the side air bag to protect only the leg of the occupant of the related art is not mounted separately. Therefore, the design flexibility of the seat or the door can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A side air bag for protecting an occupant of a seat of a motor vehicle, said side air bag comprising:
   an air cushion;
   an inflator that supplies gas to the air cushion,
   wherein the air cushion comprises:
   an upper body protection area configured to protect an upper body including a head and a flank of an occupant;
   a hip protection area connected to a lower end of the upper body protection area configured to protect a hip of the occupant;
   a leg protection area connected to the hip protection area that protrudes from the hip protection area and extends farther than the seat in a forward direction, the leg protection area being configured to protect a leg of the occupant; and
   a lower body protection area, which includes the hip protection area and the leg protection area, connected to and in communication with the upper body protection area to form a generally L-shaped side air bag, wherein the upper body protection area includes a bulge corresponding to the head of the occupant, a side protection area that is narrower than the bulge, and a recess extending inwardly from a front side of the side air bag, the recess connecting the upper body protection area to the lower body protection area, and wherein the side air bag extends entirely along a side of the seat.

2. The side air bag according to claim 1, further comprising a collision detection sensor that detects an impact, the collision detection sensor being configured to cause a gas to be discharged to the side air bag upon detecting the impact.

3. The side air bag according to claim 2, wherein the upper body protection area, the hip protection area, and the leg protection area are configured to inflate sequentially when the gas is discharged to the side air bag.

4. The side air bag according to claim 2, wherein the upper body protection area, the hip protection area, and the leg protection area are configured to expand generally simultaneously when the gas is discharged to the side air bag.

5. A side air bag for protecting an occupant of a seat, comprising:
   an upper body protection area configured to protect an upper body including a head and a flank of an occupant;
   a lower body protection area configured to protect a region corresponding to at least a lower portion of an occupant, the lower body protection area comprising:
   a hip protection area configured to protect a region corresponding to at least a hip of the occupant;
   a leg protection area configured to protect a region extending farther than the seat in a forward direction, wherein the leg protection area and the hip protection area are connected such that the leg protection area communicates with the hip protection area; and
   wherein the upper body protection area is connected to and in communication with the lower body protection area, the upper body protection area includes a bulge corresponding to the head of the occupant, a side protection area that is narrower than the bulge, and a recess extending inwardly from a front side of the side air bag, the recess connecting the upper body protection area to the lower body protection area, and wherein the side air bag extends entirely along a side of the seat.

6. The side air bag according to claim 5, wherein a portion of the leg protection area protrudes from a portion of the hip protection area.

7. The side air bag according to claim 5, further comprising a collision detection sensor that detects an impact, the sensor being configured to cause a gas to be discharged to the side air bag upon detecting the impact.

8. The side air bag according to claim 7, wherein the upper body protection area, the hip protection area, and the leg protection area are configured to inflate sequentially when the gas is discharged to the side air bag.

9. The side air bag according to claim 7, wherein the upper body protection area, the hip protection area, and the leg protection area are configured to expand generally simultaneously when the gas is discharged to the side air bag.

* * * * *